United States Patent
Kale et al.

(10) Patent No.: US 9,233,658 B2
(45) Date of Patent: Jan. 12, 2016

(54) SINUSOIDAL CRUSH CAN ASSEMBLY

(71) Applicant: MAGNA INTERNATIONAL INC., Aurora (CA)

(72) Inventors: Suresh R. Kale, Pune (IN); Santosh Billur, Bangalore (IN); Prashant G. Khadabadi, Bangalore (IN)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/372,356

(22) PCT Filed: Jan. 10, 2013

(86) PCT No.: PCT/CA2013/000017
§ 371 (c)(1),
(2) Date: Jul. 15, 2014

(87) PCT Pub. No.: WO2013/106905
PCT Pub. Date: Jul. 25, 2013

(65) Prior Publication Data
US 2014/0346790 A1    Nov. 27, 2014

Related U.S. Application Data

(60) Provisional application No. 61/587,820, filed on Jan. 18, 2012.

(51) Int. Cl.
*B60R 19/34* (2006.01)
*B60R 19/18* (2006.01)

(52) U.S. Cl.
CPC .................. *B60R 19/34* (2013.01); *B60R 19/18* (2013.01)

(58) Field of Classification Search
CPC ................................ B60R 19/34; B60R 19/18

USPC .......................................................... 293/133
See application file for complete search history.

(56) References Cited

U.S. PATENT DOCUMENTS

| | | | |
|---|---|---|---|
| 6,929,297 B2 | 8/2005 | Muller et al. | |
| 7,651,155 B2 * | 1/2010 | Tan et al. | 296/187.03 |
| 7,677,617 B2 | 3/2010 | Stewart et al. | |
| 7,871,122 B2 | 1/2011 | Salomonsson | |
| 2006/0033363 A1 * | 2/2006 | Hillekes et al. | 296/187.09 |
| 2011/0098873 A1 | 4/2011 | Koga et al. | |
| 2011/0198873 A1 | 8/2011 | Perarnau Ramos et al. | |

FOREIGN PATENT DOCUMENTS

| | | |
|---|---|---|
| EP | 1477371 A2 | 11/2004 |
| FR | 2959706 A1 | 11/2011 |

* cited by examiner

*Primary Examiner* — Glenn Dayoan
*Assistant Examiner* — Melissa A Black
(74) *Attorney, Agent, or Firm* — Dickinson Wright PLLC

(57) ABSTRACT

A sinusoidal crush can assembly for a bumper assembly includes a top wall, a bottom wall spaced from the top wall, and a pair of spaced side walls that extend between the top wall and the bottom wall to present a generally tubular and trapezoidal shape. The crush can assembly further includes a sinusoidal wave portion disposed along each of the walls from the rear end towards the front end. Each of the wave portions include peaks and troughs that define a sinusoidal wave depth, and the sinusoidal wave depth reduces gradually from the front end toward the rear end. Each of the peaks and the troughs are aligned with one another. The crush can assembly further includes a wave portion separator that extends angularly between adjacent ones of the wave portions to transition between each of the sinusoidal wave portions that are disposed along each of the walls.

19 Claims, 6 Drawing Sheets

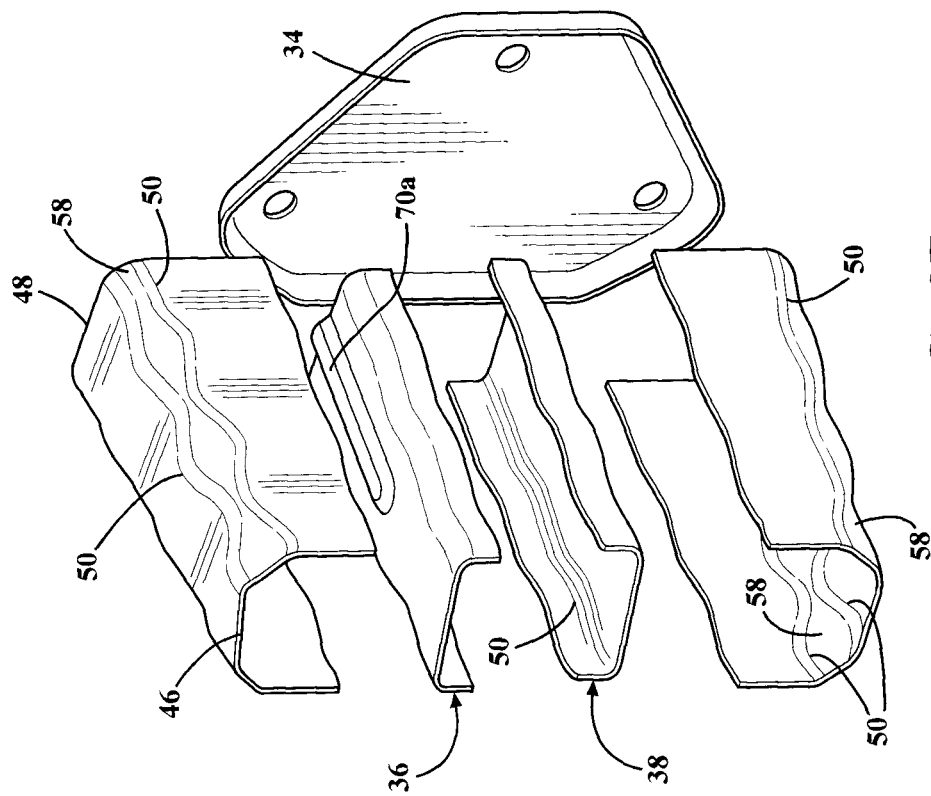
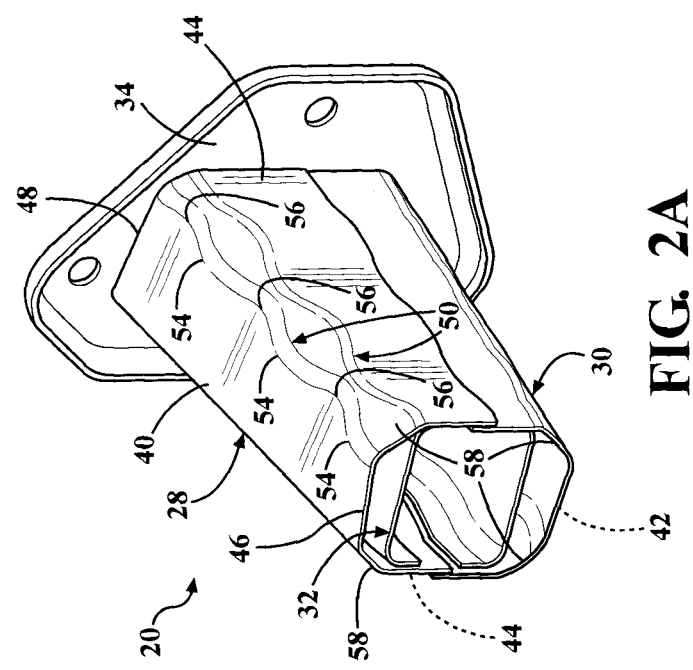

SINUSOIDAL CRUSH CAN ASSEMBLY

CROSS REFERENCE TO RELATED APPLICATIONS

This U.S. National Stage Patent Application claims the benefit of International Application serial number PCT/CA2013/000017 filed Jan. 10, 2013, entitled "Sinusoidal Crush Can Assembly" which claims priority to U.S. provisional application Ser. No. 61/587,820 filed Jan. 18, 2012, the entire disclosures of the application being considered part of the disclosure of this application, and hereby incorporated by reference.

BACKGROUND OF THE INVENTION

1. Field of the Invention

The present invention relates to a sinusoidal crush can assembly for use in a bumper assembly.

2. Description of the Prior Art

Bumper assemblies that are designed to meet AZT and IIHS 100% low speed impact test requirements typically use crush cans with flat side walls and crush initiator beads. During impact, the crush cans buckle at the beads before the flat start to buckle. However, it is difficult to control the buckling sequence with such crush cans. Further, due to the assembly welding requirements, there is a limitation on the number of beads that can be provided on the crush can. In addition, crush cans with flat walls do not collapse fully, which limits the amount of impact energy absorbed and the material utilization.

SUMMARY OF THE INVENTION

The present invention provides for a sinusoidal crush can assembly for use in a vehicle bumper assembly. The crush can assembly includes a top wall, a bottom wall spaced from the top wall, and a pair of spaced side walls that extend between the top wall and the bottom wall. Each of the top wall, the bottom wall, and the pair of side walls extend between a front end and a rear end. The crush can assembly further includes a sinusoidal wave portion that is disposed along each of the top wall, the bottom wall, and the pair of side walls. Each sinusoidal wave portion extends from the rear end towards the front end of the crush can assembly. Each of the sinusoidal wave portions include a plurality of peaks and a plurality of troughs. Each of the peaks and the troughs that are disposed along each of the top wall, the bottom wall, and the pair of side walls are aligned with one another. The crush can assembly further includes a wave portion separator that extends angularly between adjacent ones of the sinusoidal wave portions. The wave portion separators transition between each of the sinusoidal wave portions that are disposed along each of the top wall, the bottom wall, and the pair of side walls.

The crush can assembly of the present invention may be utilized in a bumper assembly for a vehicle. The bumper assembly includes a bumper beam that is secured to a vehicle to initially absorb an impact to the vehicle. At least one, preferably a plurality, of crush can assemblies are used to secure the bumper beam to the vehicle. The front end of the crush can assembly engages the bumper beam and the rear end of the crush can assembly engages the vehicle.

Thus, several advantages of one or more aspects of the present invention include that the crush can assembly is lighter, easier to assemble, and can avoid welding overlap at the crush can assembly. In addition, the present invention allows for more crushing to occur at the crush can assembly upon impact, and more particularly, allows for more crushing to occur at the front end of the crush can assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2A is a perspective view of a crush can assembly according to the subject invention;

FIG. 2B is an exploded view of the crush can assembly according to the subject invention;

DETAILED DESCRIPTION OF THE ENABLING EMBODIMENTS

Referring to the Figures, wherein like numerals indicate corresponding parts throughout the several views, a sinusoidal crush can assembly 20 for use in a vehicle bumper assembly 24 is generally shown.

Figure 1:
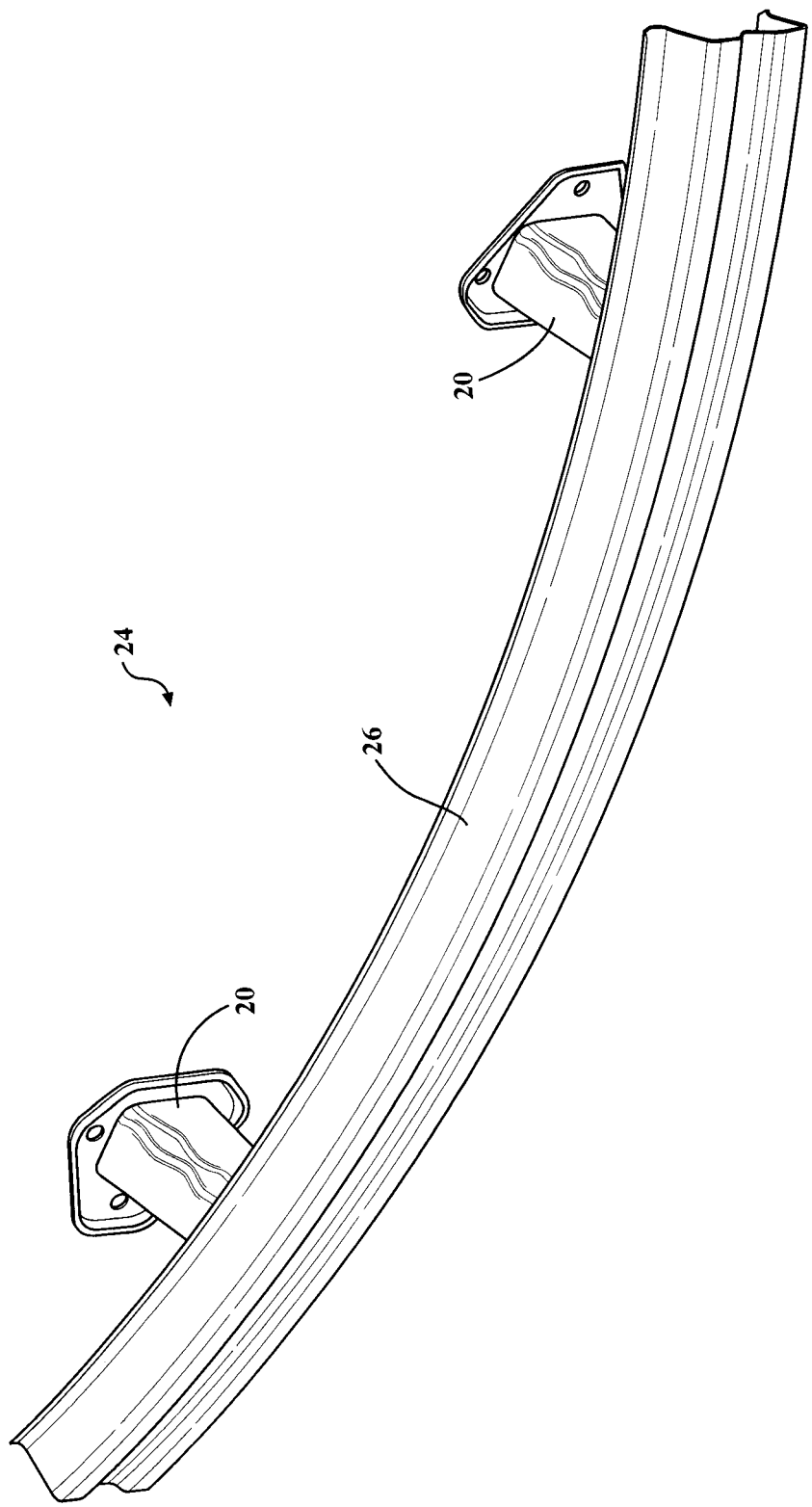
FIG. 1 is a perspective view of a bumper assembly having a pair of crush can assemblies and a bumper beam secured thereto according to the subject invention.

FIG. 1 shows an exemplary bumper assembly 24 utilizing the crush can assembly 20 accordingly to an embodiment of the present invention. The bumper assembly 24 includes at least one crush can assembly 20 and a bumper beam 26 secured thereto. The bumper beam 26 is secured to a vehicle for initially absorbing an impact to a vehicle. In the preferred embodiment, the bumper assembly 24 includes a pair of crush can assemblies 20. While the exemplary embodiment shows a pair of crush can assemblies 20, any number of crush can assemblies 20 may be used. In addition, while the crush can assembly 20 of the present invention is described in reference to a vehicle bumper assembly 24, any system utilizing crush can assemblies 20 for impact absorption may include a crush can assembly 20 according to the present invention.

FIGS. 2A and 2B show the components of the crush can assembly 20 of FIG. 1, including an upper crush can 28, a lower crush can 30, an inner bulkhead 32, and bumper mounting plate 34. The crush can assembly 20 engages the bumper beam 26 and is generally tubular and trapezoidally shaped. The inner bulkhead 32 includes an inner bulkhead upper portion 36 and an inner bulkhead lower portion 38.

The lower crush can 30 and upper crush can 28 engage one another to form the tubular crush can assembly 20. The tubular crush can assembly 20 includes a top wall 40, a bottom wall 42 spaced from the top wall 40, and a pair of spaced side walls 44 extending between the top wall 40 and bottom wall 42. Each of the walls 40, 42, 44 extend from a front end 46 to a rear end 48 and have a sinusoidal wave portion 50 that is disposed between the front end 46 and the rear end 48. The front end 46 of the crush can assembly 20 has a diameter that is less than the diameter of the rear end 48. That is, the crush can assembly 20 is tapered inwardly from the rear end 48 of the crush can assembly 20 towards the front end 46. The top wall 40 and the bottom wall 42 may be angled along the front end 46 between the pair of side walls 44.

Figure 3:
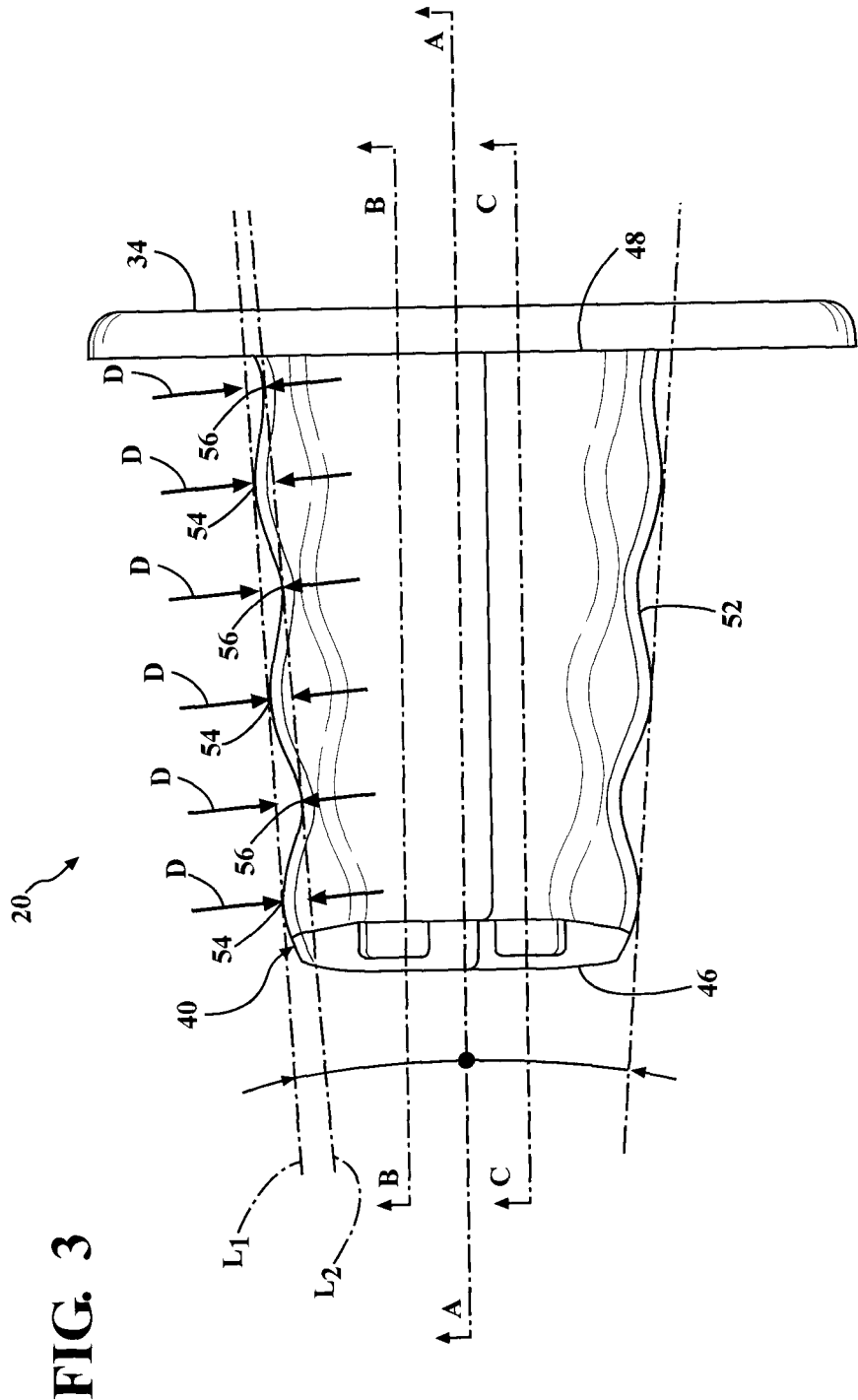
FIG. 3 is a side view of the crush can assembly showing the sinusoidal wave depth variation from the front end of the crush can assembly to the rear end of the crush can assembly according to the subject invention.

Each of the walls 40, 42, 44 further includes a middle portion 52 that is disposed between the front end 46 and the rear end 48, as shown in FIG. 3. The front end 46 of the crush can assembly 20 is the end that engages the bumper beam 26 while the rear end 48 is the end that engages the vehicle in which the bumper assembly 24 is attached. The bumper mounting plate 34 may be secured to the rear end 48 of the crush can assembly 20 to mount the crush can assembly 20 to the vehicle.

The upper crush can 28 of the crush can assembly 20 is generally U-shaped. The upper crush can 28 defines the top wall 40 and a portion of each of the pair of side walls 44. The lower crush can 30 engages the upper crush can 28 to define the shape of the crush can assembly 20. The lower crush can 30 is U-shaped and defines the bottom wall 42 and the remaining portions of each of the pair of side walls 44. In the exemplary embodiment, the lower crush can 30 is welded to the upper crush can 28 to define the shape of the crush can assembly 20.

While the crush can assembly 20 may include separate upper and lower crush cans 28, 30, with the hydro forming process, the upper and lower crush cans 28, 30 can be combined into a single part. In addition, by changing the thickness of the upper and lower crush cans 28, 30, the inner bulkhead 32 may be eliminated.

FIGS. 2A and 2B further show the sinusoidal wave portion 50 defined in the top wall 40 and one of the side walls 44. A sinusoidal wave portion 50 is disposed along each of the top wall 40, the bottom wall 42, and the pair of side walls 44. Each sinusoidal wave portion 50 extends from the rear end 48 towards the front end 46 and includes at least one peak 54 that extends outwardly from the crush can assembly 20 and at least one trough 56 that extends inwardly into the crush can assembly 20. In the preferred embodiment, each of the sinusoidal wave portions 50 include a plurality of peaks 54 and troughs 56. Each peak 54 is spaced from the adjacent peak 54 by one of the troughs 56.

The at least one peak 54 and at least one trough 56 of each of the sinusoidal wave portions 50 define a sinusoidal wave depth D. The sinusoidal wave depth D of the sinusoidal wave portion 50 along the top wall 40 is shown in FIG. 3. A first line $L_1$ is disposed tangent to each of the peaks 54, a second line $L_2$ is disposed tangent to each of the troughs 56, and the sinusoidal wave depth D is equal to the distance between the first line $L_1$ and the second line $L_2$. For example, the sinusoidal wave depth D at each peak 54 is equal to the distance between the first line $L_1$ and the second line $L_2$ at the respective peak 54, and the sinusoidal wave depth D at each trough 56 is equal to the distance between the first line $L_1$ and the second line $L_2$ at the respective trough 56.

Each of the walls 40, 42, 44 preferably include the same number of peaks 54 and the same number of troughs 56. The peaks 54 and troughs 56 disposed along each of the top wall 40, the bottom wall 42, and the pair of side walls 44 are aligned with one another. The peak 54 disposed along the top wall 40 closest to the front end 46 is aligned with the peak 54 disposed along the bottom wall 42 closest to the front end 46 and the peaks 54 disposed along the side walls 44 closest to the front end 46. The peak 54 disposed along the top wall 40 closest to the rear end 48 is aligned with the peak 54 disposed along the bottom wall 42 closest to the rear end 48 and the peaks 54 disposed along the side walls 44 closest to the rear end 48.

As shown in FIG. 2A, the sinusoidal wave portion 50 of each of the walls 40, 42, 44 is linked to an adjacent sinusoidal wave portion 50 by a wave portion separator 58. The wave portion separator 58 extends angularly between adjacent ones of the sinusoidal wave portions 50 to transition between the sinusoidal wave portions 50 disposed along each of the top wall 40, the bottom wall 42, and the pair of side walls 44. In the exemplary embodiment, the wave portion separator 58 extends at a 45 degree angle between adjacent walls 40, 42, 44 of the crush can assembly 20.

The sinusoidal wave depth D of the sinusoidal wave portion 50 at each peak 54 and trough 56 can be changed to achieve a desired section force and crush can collapse sequence. During impact, it is important to absorb the impact energy in the initial phase of the impact. To achieve this, the collapse sequence of the crush can assembly 20 needs to happen in the front end 46, then the middle portion 52, followed by the rear end 48. The middle portion 52 of the crush can assembly 20 is softer than the rear end 48, and the front end 46 needs to be softer than the middle portion 52. To achieve this, the sinusoidal wave portion 50 is made deeper in the front end 46 of the crush can assembly 20 and the sinusoidal wave depth D gradually reduces towards the rear end 48 of the crush can assembly 20. This facilitates the crushing of the crush can assembly 20 in the desired sequence. The sinusoidal wave portion 50 on each of the walls 40, 42, 44 helps to crush the walls 40, 42, 44 fully and allows the crushing to happen in the intended direction.

Figure 4:
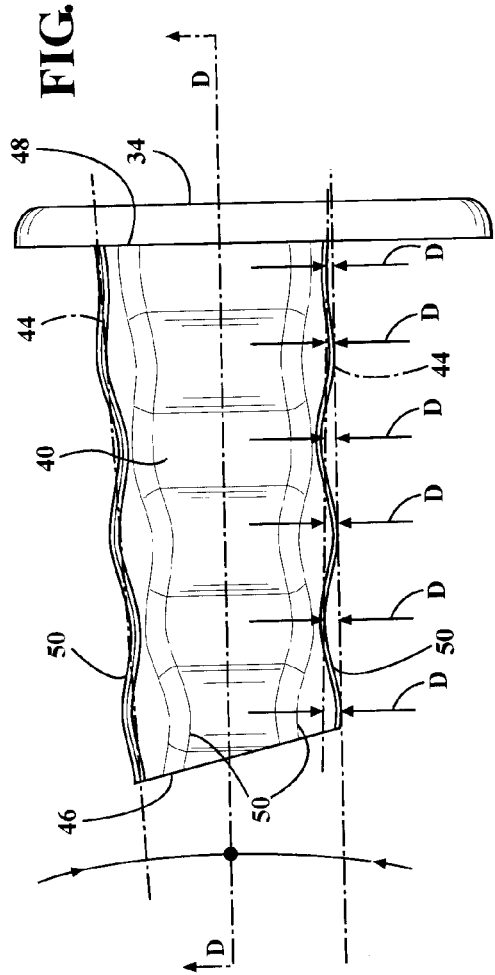
FIG. 4 is a top view of the crush can assembly showing the sinusoidal wave depth variation from the front end of the crush can assembly to the rear end of the crush can assembly according to the subject invention.

FIG. 3 shows the sinusoidal wave depth D variation of the sinusoidal wave portion 50 from the front end 46 of the crush can assembly 20 to the rear end 48 of the crush can assembly 20 along the top wall 40 and one of the side walls 44. Based on the configuration shown in the FIG. 3, the front end 46 of the crush can assembly 20 is more crushable than the rear end 48. FIG. 4 shows the sinusoidal wave depth D variation of the sinusoidal wave portion 50 from the front end 46 of the crush can assembly 20 to the rear end 48 of the crush can assembly 20 along the top wall 40 and side walls 44. Also, FIG. 4 shows the alignment of the sinusoidal wave portions 50 defined in top wall 40 and side walls 44. In the preferred form, the sinusoidal wave portions 50 defined in top wall 40 and side walls 44 are aligned. This sinusoidal wave portion 50 alignment assists in improved crushing of the crush can assembly 20.

Figure 5B:
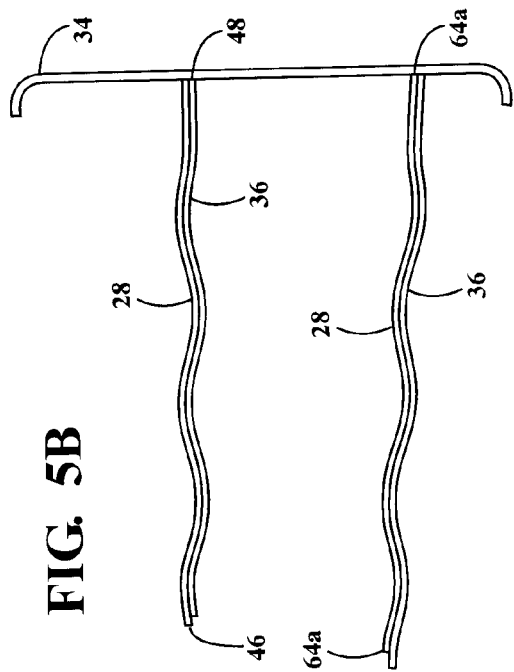
FIG. 5B is a cross-sectional view of the crush can assembly taken along the horizontal plane B-B of FIG. 3 according to the subject invention.
Figure 5A:
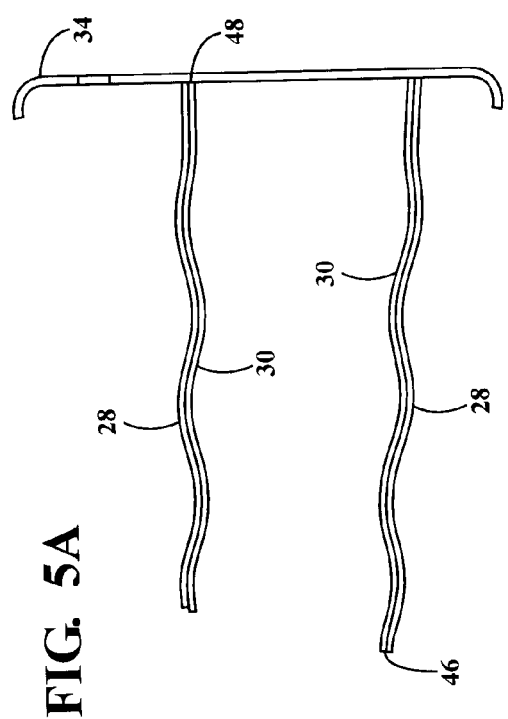
FIG. 5A is a cross-sectional view of the crush can assembly taken along the horizontal plane A-A of FIG. 3 according to the subject invention.
Figure 5C:
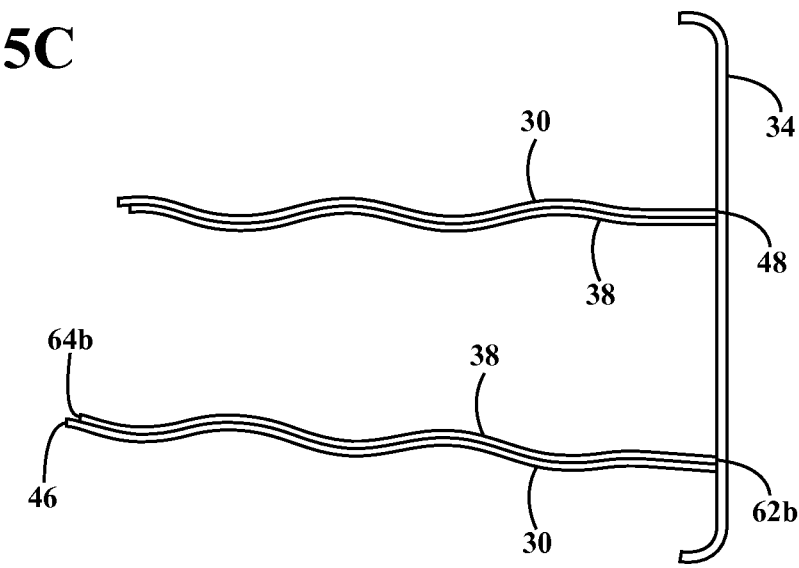
FIG. 5C is a cross-sectional view of the crush can assembly taken along the horizontal plane C-C of FIG. 3 according to the subject invention.
Figure 6:
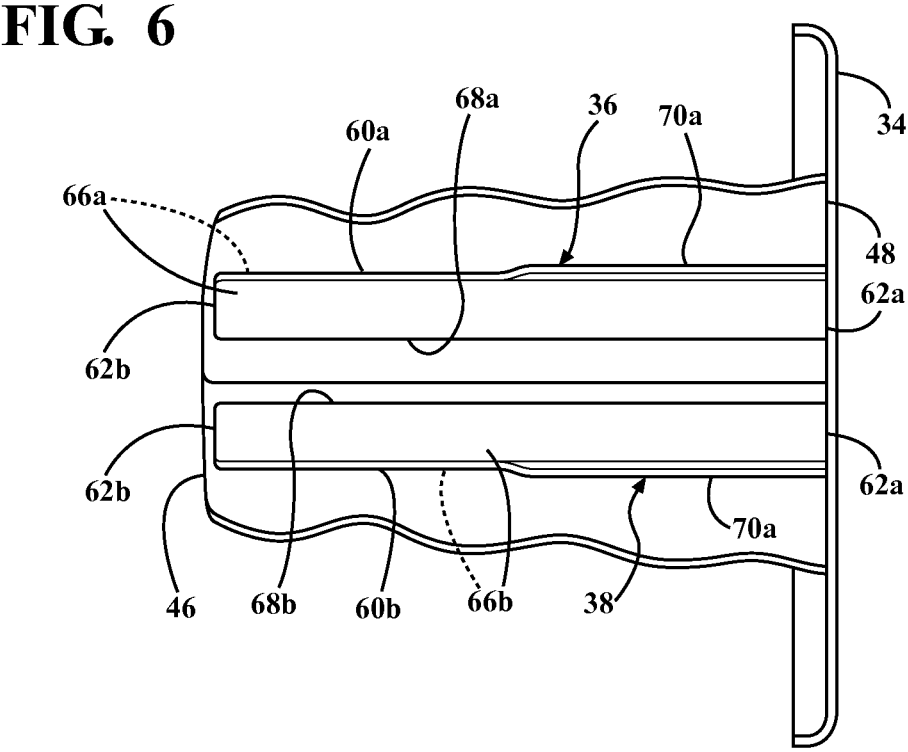
FIG. 6 is a cross-sectional view of the crush can assembly taken along the vertical plane D-D of FIG. 4 according to the subject invention.

FIGS. 5A, 5B, and 5C show sections of the crush can assembly 20 at different locations through the horizontal plane of the crush can assembly 20. FIG. 6 shows a section of the crush can assembly 20 through the vertical median of the crush can assembly 20.

In the exemplary embodiment, the crush can assembly 20 includes the inner bulkhead 32 having the inner bulkhead upper portion 36 and the inner bulkhead lower portion 38 spaced from the inner bulkhead upper portion 36. Both the inner bulkhead upper portion 36 and the inner bulkhead lower portion 38 are U-shaped and include a flat portion 60a, 60b that extends between a bulkhead rear 62a, 62b and a bulkhead front 64a, 64b, as shown in FIG. 6. The bulkhead rear 62a, 62b is aligned with the rear end 48 of the crush can assembly 20 and the bulkhead front 64a, 64b is disposed inwardly from the front end 46 of the crush can assembly 20.

Each of the inner bulkhead upper portion 36 and an inner bulkhead lower portion 38 and a pair of edge portions 66a, 66b. The edge portions 66a, 66b extend from each of the sides of the flat portion 60a, 60b to an edge end 68a, 68b. Each of the inner bulkhead upper portion 36 and the inner bulkhead lower portion 38 may be angled along the flat portions 60a, 60b between the pair of edge portions 66a, 66b. When assembled, the edge ends 68a of the inner bulkhead upper portion 36 face, but are spaced from, the edge ends 68b of the inner bulkhead lower portion 38.

The inner bulkhead upper portion 36 engages an inner surface of the upper crush can 28. The edge portions 66a of the inner bulkhead upper portion 36 preferably correspond to the shape of the pair of side walls 44, as best shown in FIGS. 2B, 5B, 5C, and 7A. That is, the edge portions 66a have a sinusoidal wave defined therein to correspond to the sinusoidal wave portion 50 of the side walls 44 of the upper crush can 28. The inner bulkhead lower portion 38 engages an inner surface of the lower crush can 30. The edge portions 66b of the inner bulkhead lower portion 38 correspond to the shape of the pair of side walls 44. That is, the edge portions 66b have a sinusoidal wave defined therein to correspond to the sinusoidal wave portion 50 of the side walls 44 of the lower crush can 30.

In the embodiment of FIGS. 2B, 6, 7A, 7B and 7C, the inner bulkhead upper portion 36 has a stiffening bead 70a defined therein. The stiffening bead 70a extends outwardly from the outer surface of the inner bulkhead upper portion 36 and is disposed adjacent the rear end 48 of the inner bulkhead upper portion 36. The stiffening bead 70a is utilized to make the rear end 48 of the crush can assembly 20 stiffer than the front end 46. In the preferred embodiment, the stiffening bead length is approximately 50% of the length of the inner bulkhead upper portion 36.

Figure 7A:
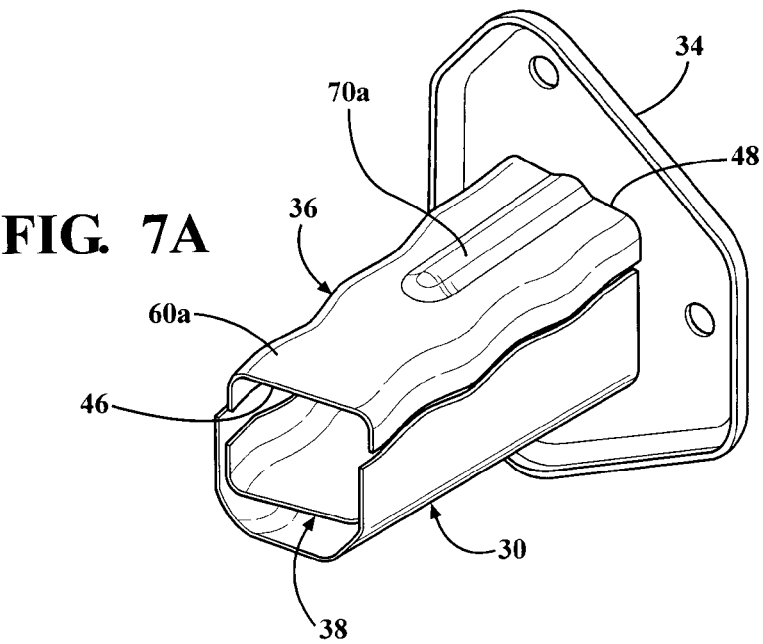
FIG. 7A is a partial perspective view of a crush can assembly showing an inner bulkhead having a stiffening bead according to the subject invention.
Figure 7B:
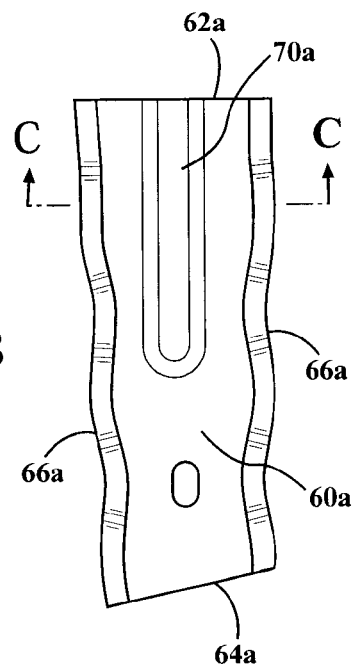
FIG. 7B is a partial top view of a crush can assembly showing the inner bulkhead having a stiffening bead according to the subject invention.
Figure 7C:
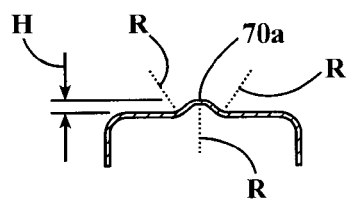
FIG. 7C is a cross-sectional view of the inner bulkhead taken along the line C-C of FIG. 7B.

While the stiffening bead 70a of FIGS. 7A, 7B, and 7C is shown in reference to the inner bulkhead upper portion 36, it should be noted that the inner bulkhead lower portion 38 may also include a stiffening bead 70b to make the rear end 48 of the crush can assembly 20 stiffer than the front end 46. In the embodiment of FIG. 6, both the inner bulkhead upper portion 36 and the inner bulkhead lower portion 38 include a stiffening bead 70a, 70b. The stiffening bead 70b on inner bulkhead lower portion 38 extends outwardly from the outer surface of the inner bulkhead lower portion 38 and is disposed adjacent the rear end 48 of the inner bulkhead lower portion 38. The stiffening bead length is approximately 50% of the length of the inner bulkhead lower portion 38.

FIG. 7C shows a bead depth H and an edge radius R of the stiffening bead 70a. The bead depth H measures the distance the stiffening bead 70a extends outwardly from the outer surface of either the inner bulkhead upper portion 36 or the inner bulkhead lower portion 38. The edge radius R measures the curvature of the stiffening bead 70a.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A sinusoidal crush can assembly for use in a bumper assembly, comprising:
   a top wall, a bottom wall spaced from said top wall, and a pair of spaced side walls extending between said top wall and said bottom wall, each of said top wall, said bottom wall, and said pair of side walls extending between a front end and a rear end, and said walls presenting an opening therebetween;
   each of said top wall, said bottom wall, and said pair of side walls including a sinusoidal wave portion extending between said rear end and said front end, each of said sinusoidal wave portions including a plurality of peaks and a plurality of troughs, wherein each of said peaks is curved outwardly relative to said opening and each of said troughs is curved inwardly relative to said opening, said peaks disposed along said top wall and said bottom wall are aligned with said peaks disposed along said side walls, said troughs disposed along said top wall and said bottom wall are aligned with said troughs disposed along said side walls; and
   a plurality of wave portion separators each extending angularly between said top wall and one of said side walls or angularly between said bottom wall and one of said of side walls.

2. The sinusoidal crush can assembly as set forth in claim 1 further including an upper crush can being U-shaped and defining said top wall and a portion of each of said pair of side walls and a lower crush can for engaging said upper crush can to define a generally tubular and trapezoidal shape of said crush can assembly, said lower crush can being U-shaped and defining said bottom wall and the remaining portion of each of said pair of side walls.

3. The sinusoidal crush can assembly as set forth in claim 2 further including an inner bulkhead having an inner bulkhead upper portion that engages an inner surface of said upper crush can and an inner bulkhead lower portion that engages an inner surface of said lower crush can and is spaced from said inner bulkhead upper portion, each being U-shaped and extending between a bulkhead rear and a bulkhead front and including a flat portion and a pair of edge portions with each of said pair of edge portions extending from the sides of said flat portion to an edge end.

4. The sinusoidal crush can assembly as set forth in claim 3 further including a stiffening bead disposed on at least one of said inner bulkhead upper portion and said inner bulkhead lower portion and extending outwardly from an outer surface of said flat portion and adjacent said bulkhead rear for stiffening said rear end of said crush can assembly.

5. The sinusoidal crush can assembly as set forth in claim 4 wherein both said inner bulkhead upper portion and said inner bulkhead lower portion include said stiffening bead.

6. The sinusoidal crush can assembly as set forth in claim 4 wherein said stiffening bead includes a stiffening bead length extending longitudinal between said bulkhead rear and said bulkhead front, said at least one of said inner bulkhead upper portion and said inner bulkhead lower portion includes a bulkhead length extending longitudinal between said bulkhead rear and said bulkhead front, and said stiffening bead length is approximately 50% of said bulkhead length.

7. The sinusoidal crush can assembly as set forth in claim 4 wherein said stiffening bead includes a bead depth equal to the distance said stiffening bead extends outwardly from the outer surface of said flat portion and an edge radius that measures the curvature of said stiffening bead.

8. The sinusoidal crush can assembly as set forth in claim 3 wherein said inner bulkhead upper portion and said inner bulkhead lower portion are angled along said flat portion between said pair of edge portions.

9. The sinusoidal crush can assembly as set forth in claim 3 wherein said edge ends are distal ends, and said edge ends of the inner bulkhead upper portion face and are spaced from said edge ends of said inner bulkhead lower portion.

10. The sinusoidal crush can assembly as set forth in claim 3 wherein said edge portions of said inner bulkhead upper portion and said inner bulkhead lower portion correspond to the shape of said pair of side walls.

11. The sinusoidal crush can assembly as set forth in claim 3 wherein said bulkhead fronts of each of said inner bulkhead upper portion and said inner bulkhead lower portion are disposed inwardly from said front end of said crush can assembly.

12. The sinusoidal crush can assembly as set forth in claim 1 further including an inner bulkhead having an inner bulkhead upper portion and an inner bulkhead lower portion spaced from said inner bulkhead upper portion, each being U-shaped and extending between a bulkhead rear and a bulkhead front and including a flat portion and a pair of edge portions with each of said pair of edge portions extending from the sides of said flat portion to an edge end for engaging an inner surface of said pair of side walls.

13. The sinusoidal crush can assembly as set forth in claim 1 wherein each of said sinusoidal wave portions defines a sinusoidal wave depth, said sinusoidal wave depth being equal to the distance between a first line disposed tangent to said peaks and a second line disposed tangent to said troughs, and said sinusoidal wave depth being greater adjacent said front end of said crush can assembly than adjacent said rear end of said crush can assembly.

14. The sinusoidal crush can assembly as set forth in claim 13 wherein said sinusoidal wave depth gradually reduces from said front end towards said rear end of said crush can assembly along each of said top wall, said bottom wall, and said pair of side walls.

15. The sinusoidal crush can assembly as set forth in claim 1 wherein each of said wave portion separators extend angularly at a 45 degree angle between adjacent ones of said sinusoidal wave portions.

16. The sinusoidal crush can assembly as set forth in claim 1 wherein said front end is angled along said top wall and said bottom wall between said pair of side walls.

17. A bumper assembly for a vehicle, comprising:
a bumper beam secured to a vehicle for initially absorbing an impact to said vehicle;
at least one crush can assembly engaging said bumper beam and having a top wall, a bottom wall spaced from said top wall, and a pair of spaced side walls extending between said top wall and said bottom wall, said walls presenting an opening therebetween, and said crush can assembly extending between a front end for engaging said bumper beam and a rear end for engaging said vehicle;
each of said top wall, said bottom wall, and said pair of side walls including a sinusoidal wave portion extending between said rear end and said front end, each of said sinusoidal wave portions including a plurality of peaks and a plurality of troughs, wherein each of said peaks is curved outwardly relative to said opening and each of said troughs is curved inwardly relative to said opening, said peaks disposed along said top wall and said bottom wall are aligned with said peaks disposed along said side walls, said troughs disposed along said top wall and said bottom wall are aligned with said troughs disposed along said side walls; and
a plurality of wave portion separators each extending angularly between said top wall and one of said side walls or angularly between said bottom wall and one of said of side walls.

18. The bumper assembly as set forth in claim 17 further including a plurality of said crush can assemblies engaging said bumper beam.

19. The bumper assembly as set forth in claim 17 further including a bumper mounting beam for engaging said rear end of said least one crush can assembly for securing said least one crush can assembly to said vehicle.

* * * * *